US012523360B1

(12) United States Patent
Kennedy

(10) Patent No.: US 12,523,360 B1
(45) Date of Patent: Jan. 13, 2026

(54) LIGHTING SHINGLE CLIP

(71) Applicant: Canny Systems, LLC, Mansfield, TX (US)

(72) Inventor: Stacy L. Kennedy, Mansfield, TX (US)

(73) Assignee: Canny Systems, LLC, Mansfield, TX (US)

( * ) Notice: Subject to any disclaimer, the term of this patent is extended or adjusted under 35 U.S.C. 154(b) by 0 days.

(21) Appl. No.: 19/060,726

(22) Filed: Feb. 23, 2025

(51) Int. Cl.
*F21V 21/088* (2006.01)
*F21S 4/10* (2016.01)
*F21W 131/107* (2006.01)

(52) U.S. Cl.
CPC .............. *F21V 21/088* (2013.01); *F21S 4/10* (2016.01); *F21W 2131/107* (2013.01)

(58) Field of Classification Search
CPC ....... F21V 21/088; F21V 21/0885; F21S 4/10
See application file for complete search history.

(56) References Cited

U.S. PATENT DOCUMENTS

D285,287 S 8/1986 Tannar
D316,958 S 5/1991 Rumpel
D317,252 S 6/1991 Rumpel
D340,183 S 10/1993 Rumpel
D356,246 S 3/1995 Adams
D356,492 S 3/1995 Adams
5,562,269 A 10/1996 Protz, Jr.
D375,453 S 11/1996 Fleck
5,669,709 A 9/1997 Adams
D402,396 S 12/1998 Protz, Jr.
D406,383 S 3/1999 Adams
D414,291 S 9/1999 Gary et al.
D671,826 S 12/2012 Adams, IV et al.
D675,510 S 2/2013 Gary et al.
8,888,337 B2 11/2014 Adams, IV
D824,246 S 7/2018 Ming
10,180,242 B2 1/2019 Schreiber
10,443,825 B2 10/2019 Kennedy
D939,335 S 12/2021 Kennedy
D957,929 S 7/2022 Kennedy
11,879,619 B2 1/2024 Kennedy
11,971,156 B1 4/2024 Ketterling
(Continued)

OTHER PUBLICATIONS

"All-in-One Gutter Clip Shingle Clip for Outdoor Decorations", Jul. 2, 2019, Amazon.com, site visited Mar. 27, 2024: https:// www.amazon.com/dp/B07TS9KH36 (Year: 2019).
(Continued)

*Primary Examiner* — Sean P Gramling
(74) *Attorney, Agent, or Firm* — ICE MILLER LLP; Justin D. Swindells

(57) ABSTRACT

A clip for a light bulb comprises a clip base and separately formed socket. The clip base comprises a baseplate with top and bottom surfaces, and a clip arm extending over the baseplate top surface. The socket comprises a socket base with socket base top and bottom sides, and a plurality of fingers positioned on the socket base top side. A receptacle is formed between the plurality of fingers and the socket base top side, that is sized and shaped to receive the light bulb. A connecting flange projects from the socket base bottom side, and an aperture is formed in the baseplate that is sized and shaped to receive the connecting flange and rotatably couple the socket to the clip base.

19 Claims, 7 Drawing Sheets

(56) References Cited

U.S. PATENT DOCUMENTS

| | | | | |
|---|---|---|---|---|
| D1,030,455 | S | 6/2024 | Song | |
| 2013/0148366 | A1* | 6/2013 | Adams, IV | F21V 21/088 362/396 |
| 2018/0017240 | A1 | 1/2018 | Schreiber et al. | |
| 2023/0160562 | A1 | 5/2023 | Kennedy | |
| 2023/0167969 | A1 | 6/2023 | Kennedy | |
| 2024/0133541 | A1 | 4/2024 | Kennedy | |
| 2024/0191867 | A1 | 6/2024 | Hendricks | |

OTHER PUBLICATIONS

"Canny Systems—The Clever Choice", Feb. 15, 2020, Facebook.com, site visited Mar. 27, 2024: https://www.facebook.com/ RidgeClip/photos/pb.100063467919444.-2207520000/2434969776816558 (Year: 2020).

"Canny System Shingle V-Clip", Aug. 18, 2022, LightsAtWholesale.com, site visited Mar. 27, 2024: https://web.archive.org/web/20220818080800/https://lightsatwholesale.com/products/canny-system-shingle-v-clip (Year: 2022).

"Canny Systems—Our new V-Clip", Sep. 2, 2022, Facebook.com, site visited Mar. 27, 2024: https://www.facebook.com/ RidgeClip/posts pfbid02MVkpHLNgtAamTbdVG1KBAghVHxVPZ1xpJGyagov8fcQV576npdMTyMIG2agvBUCgl (Year: 2022).

* cited by examiner

LIGHTING SHINGLE CLIP

FIELD OF THE INVENTION

The present invention relates generally to a roof shingle clip, and more specifically, to a clip for holding lights of decorative light strings securely to a roof shingle.

BACKGROUND OF THE INVENTION

Typically, home owners and businesses enjoy arranging decorative lights during special seasons (such as Christmas) outdoors, creating light patterns in yards, gardens, or other home outdoor areas. For example, some home owners create a light outline that delineates their front property, providing joy and entertainment to visitors and others passing by. However, installing the lights of decorative light strings is a potentially cumbersome and tedious aspect in achieving a straight and/or secure light arrangement. Further accounting for a great likelihood of unfavorable weather, installing the light decorations can be a frustrating process when lights of a string are not properly supported. Furthermore, the process can be further frustrating when attempting to orient the lights of a string in a uniform manner, e.g., have all the lights in a straight, perpendicular orientation relative to the ground. From home owners, to businesses, to governmental entities, the time required in the decorating process is a huge yearly investment. Thus, there is a need for a device and method that will improve the above-stated and other problems, including, for example, holding lights in a straight and secure manner.

SUMMARY OF THE INVENTION

According to one aspect of the present disclosure, a clip for a light bulb comprises a clip base and separately formed socket. The clip base comprises a baseplate and a clip arm. The baseplate has baseplate first and second ends, and baseplate top and bottom surfaces. The clip arm has clip arm first and second ends, the clip arm extending over the baseplate top surface, with the clip arm first end projecting from the baseplate top surface and the clip arm second end extending toward the baseplate second end. The socket comprises a socket base with socket base top and bottom sides, and a plurality of fingers positioned on the socket base top side. A receptacle is formed between the plurality of fingers and the socket base top side, the receptacle sized and shaped to receive the light bulb. The socket is rotatably coupled to the clip base.

In a further embodiment, the clip comprises a connecting flange projecting from the socket base bottom side, and an aperture formed in the baseplate. The aperture sized and shaped to receive the connecting flange and rotatably couple the socket to the clip base. In a further embodiment, the connecting flange comprises a head spaced apart from the socket base bottom side by a shaft, and the aperture is sized and shaped to rotatably receive the shaft. The aperture has an aperture width, and the head has a head width that is larger than the aperture width. The baseplate is captured between the socket base bottom side and the head, when the shaft is received in the aperture. In a further embodiment, the baseplate has a baseplate perimeter, and further comprises a slot with a slot first end having a slot first opening to the aperture, and a slot second end having a slot second opening to the baseplate perimeter.

According to another aspect of the present disclosure, a clip for a light bulb comprises a clip base and separately formed socket. The clip base comprises a baseplate and a clip arm. The baseplate has baseplate first and second ends, and baseplate top and bottom surfaces. The clip arm has clip arm first and second ends, the clip arm extending over the baseplate top surface, with the clip arm first end projecting from the baseplate top surface and the clip arm second end extending toward the baseplate second end. The socket comprises a socket base with socket base top and bottom sides, and a plurality of fingers positioned on the socket base top side. A receptacle is formed between the plurality of fingers and the socket base top side, the receptacle sized and shaped to receive the light bulb. The socket is rotatably coupled to the clip base. A connecting flange projects from the baseplate top surface. An aperture is formed in the socket base, the aperture sized and shaped to receive the connecting flange and rotatably couple the socket to the clip base.

In a further embodiment, the socket has an axis of rotation, and the socket base has a socket base perimeter. The connecting flange comprises a head spaced apart from the socket base bottom side by a shaft, and the aperture is sized and shaped to rotatably receive the shaft. The socket base includes a slot with a first slot end having a first slot opening to the aperture, and a second slot end having a second slot opening to the socket base perimeter. The shaft is received in the aperture by snap fit insertion through the first slot opening.

Additional aspects of the disclosure will be apparent to those of ordinary skill in the art in view of the detailed description of various embodiments, which is made with reference to the drawings, a brief description of which is provided below.

Figure 1:
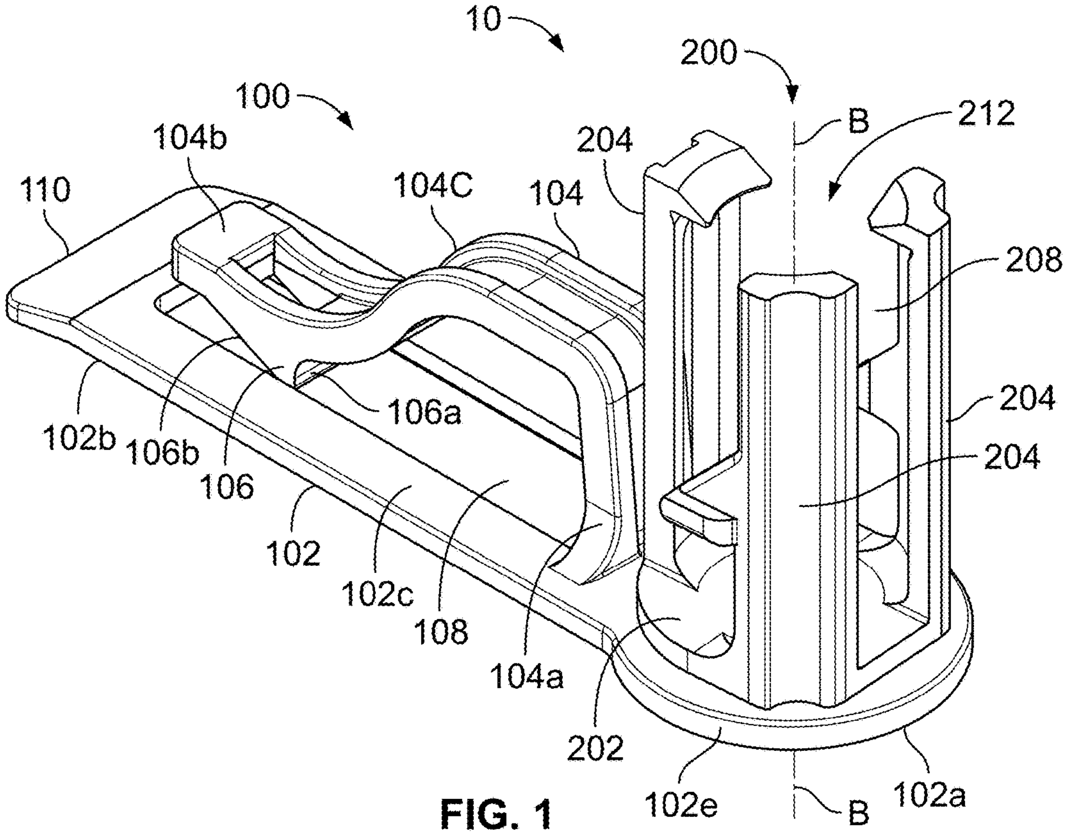
FIG. 1 is a perspective view of a clip for a light bulb, according to one embodiment.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 2:
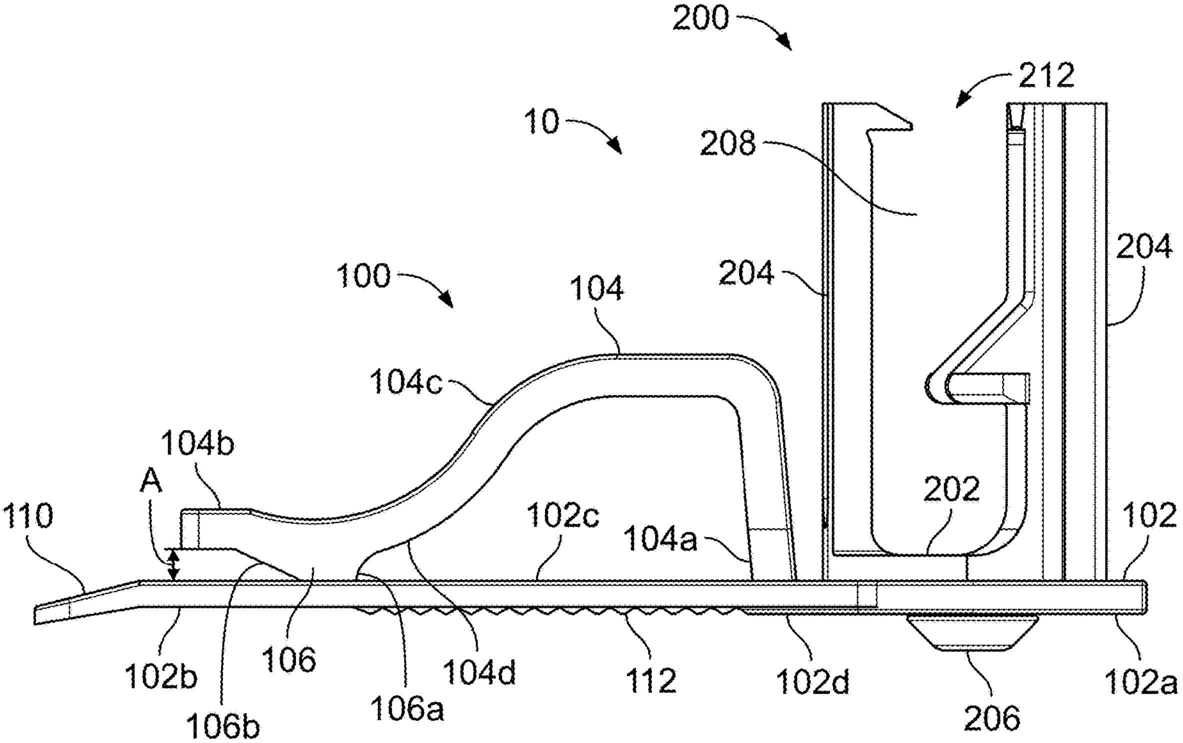
FIG. 2 is a left side elevation view of the clip of FIG. 1.
Figure 3:
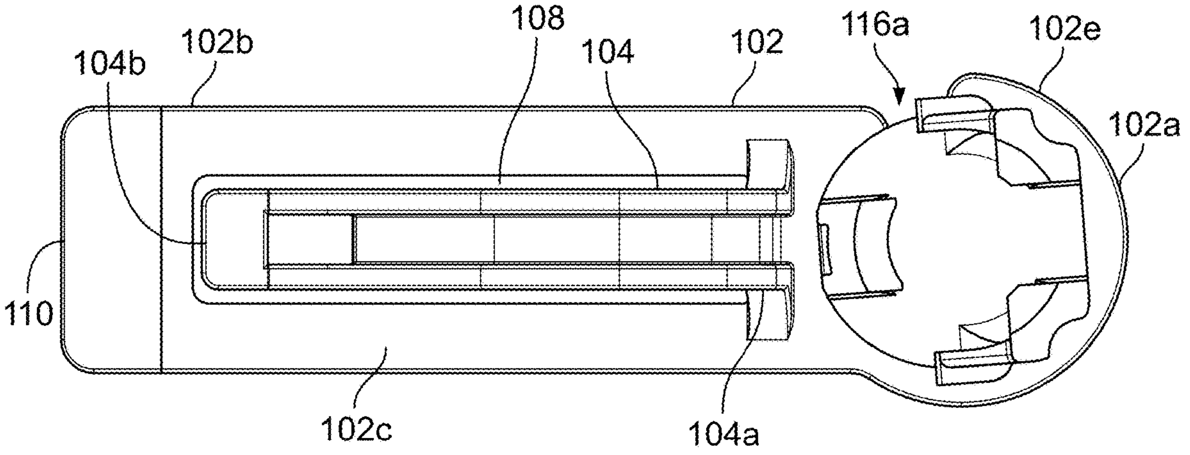
FIG. 3 is a top view of the clip of FIG. 1.
Figure 4:
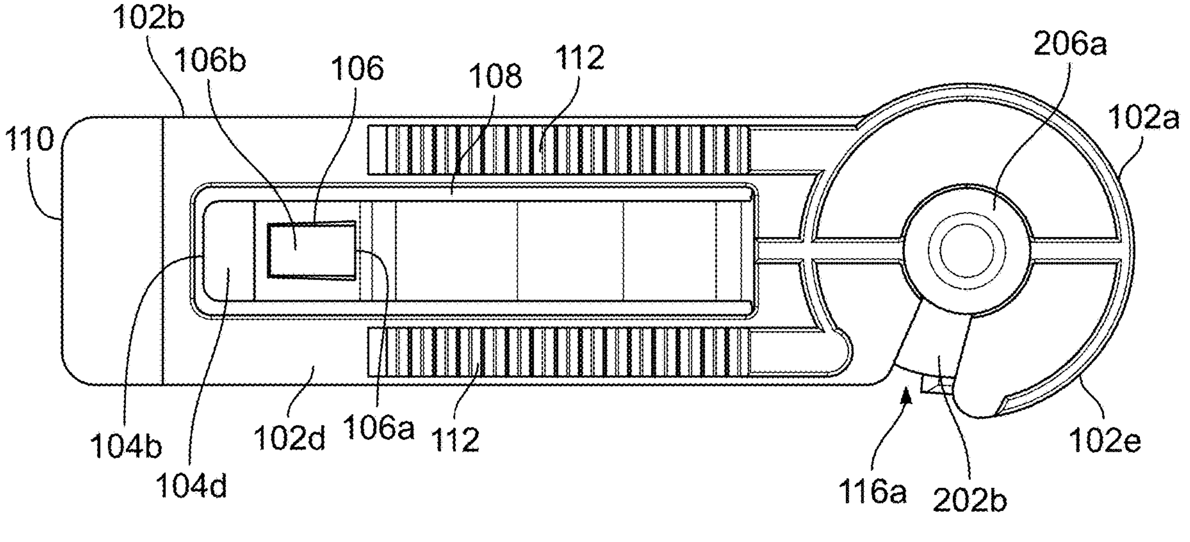
FIG. 4 is a bottom view of the clip of FIG. 1.
Figure 5:
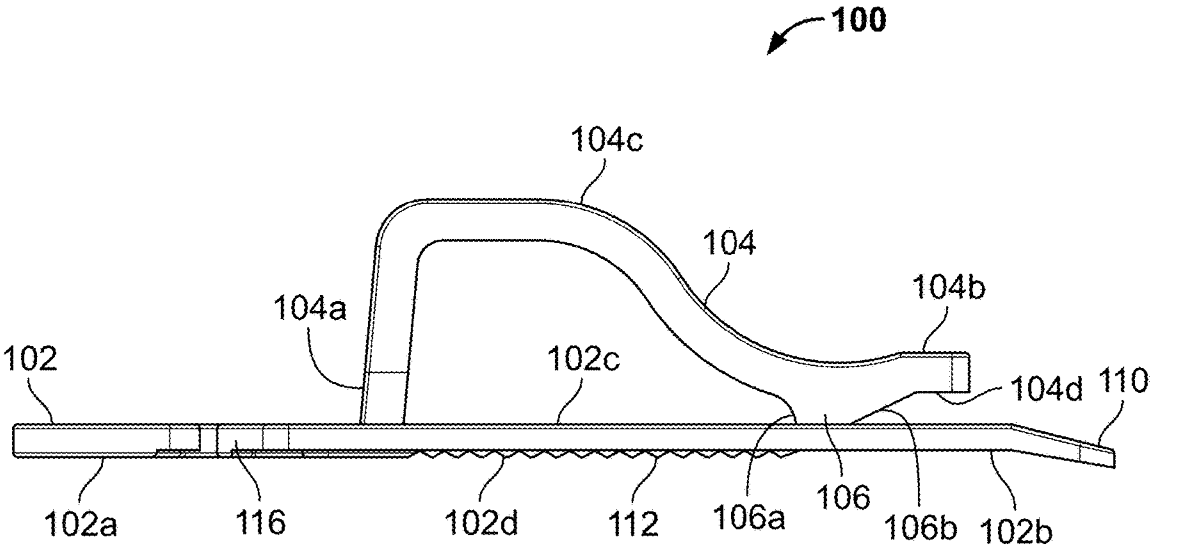
FIG. 5 is a right side elevation view of the clip base of FIG. 1.
Figure 6:
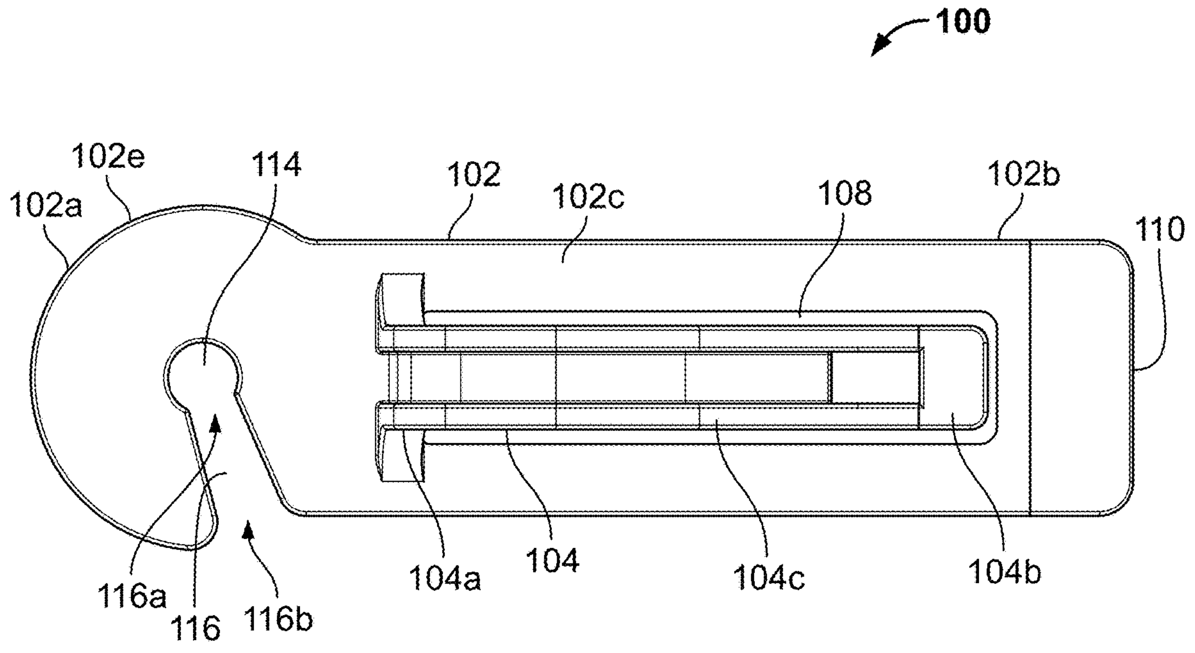
FIG. 6 is a top view of the clip base of FIG. 5.
Figure 7:
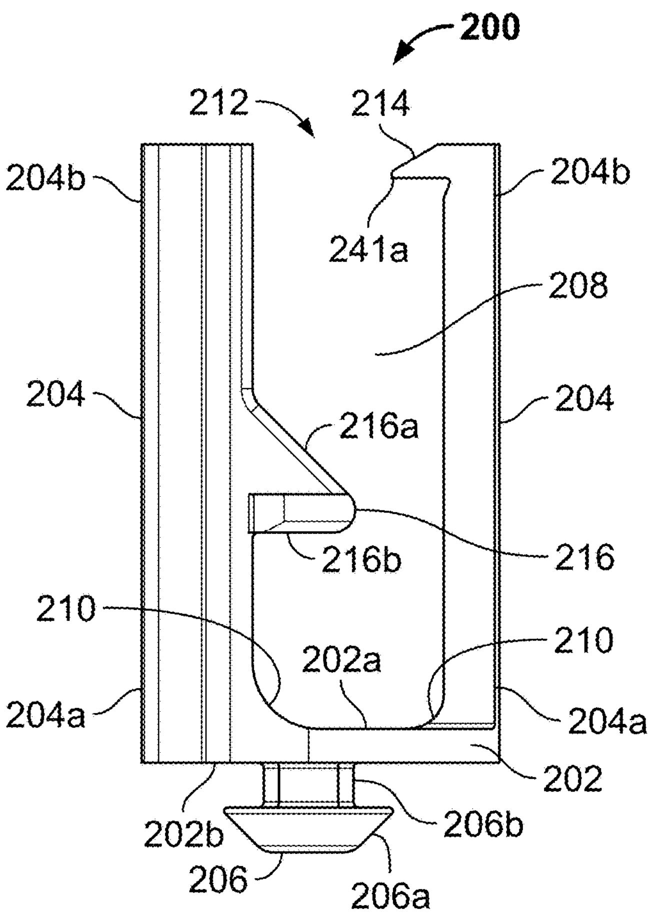
FIG. 7 is a side elevation view of the socket of FIG. 1.
Figure 8:
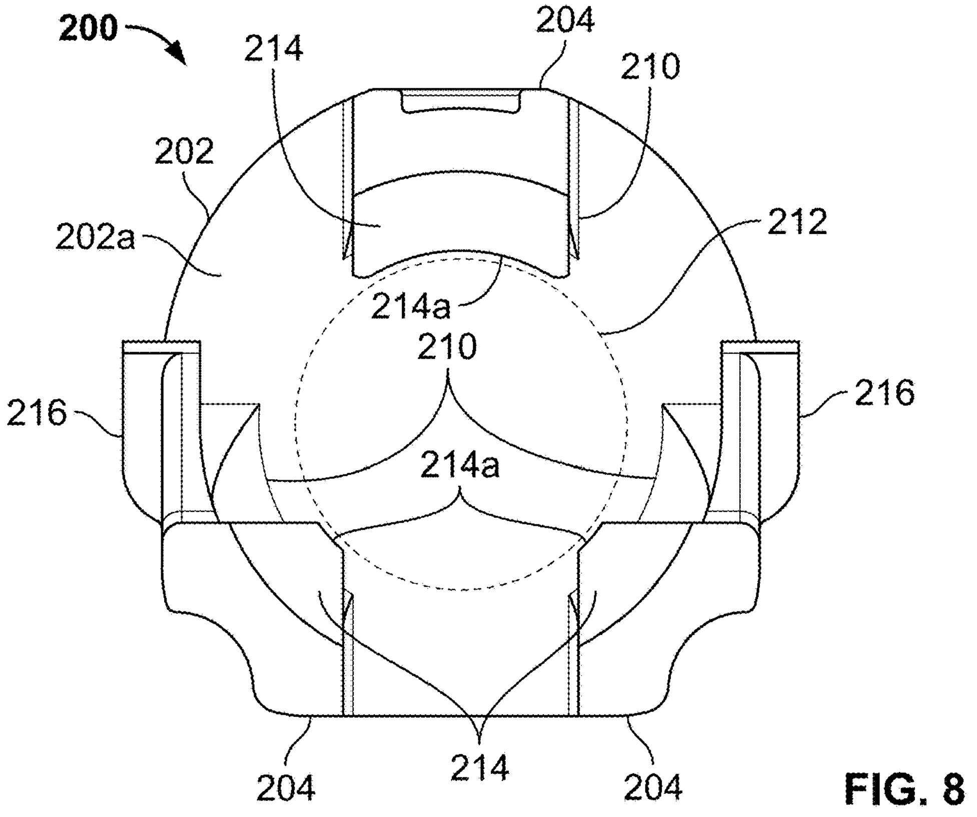
FIG. 8 is a top view of the socket of FIG. 7.

Referring to FIGS. 1-8, a light clip 10 is shown for holding and mounting a light bulb on a structural or architectural component of a building. In one embodiment, light clip 10 is configured to be clipped to a roof shingle to mount and hold a light bulb secure on the shingle, such as a conventional C7 or C9 light bulb installed on 10" or 12" roof shingle. Multiple light clips may be arranged on a roof to hold a series of light bulbs in a desired light pattern, such as a series of light bulbs on a light string (e.g., Christmas string lights) outlining a roofline or roof edge.

Light clip 10 includes a clip base 100, and a socket 200 coupled to the clip base. Clip base 100 and socket 200 are preferably separately formed, and are coupled together. In one embodiment, clip base 100 and socket 200 are coupled by a connecting flange, which may also be a separate element, or may be connected to either clip base 100 or socket 200. Socket 200 is preferably rotatably coupled to clip base 100, and may be removably coupled to the clip base.

Clip base 100 includes a baseplate 102 and a clip arm 104. Baseplate 102 has a generally planar shape, with opposite ends 102*a* and 102*b*, and top and bottom surfaces 102*c* and 102*d*. In one embodiment, baseplate top surface 102*c* and/or bottom surface 102*d* are generally planar. Clip arm 104 extends over baseplate top surface 102*c*, and has opposite ends 104*a* and 104*b*. Clip arm end 104*a* is coupled to and projects from baseplate top surface 102*c*, opposite to baseplate bottom surface 102*d*. Clip arm end 104*b* extends toward baseplate end 102*b*. In one embodiment, clip arm 104 has a curved portion between ends 104*a* and 104*b*, that bends back toward baseplate top surface 102*c*. Clip arm end 104*b* extends from curved portion 104*c* toward baseplate end 102*b*, and preferably extends generally parallel to the plane of baseplate top surface 102*c*.

Clip base 100 is configured to mount light clip 10 by receiving a structural or architectural component of a building. In a one embodiment, clip base 100 is adapted to receive a roofing shingle or tile between clip arm 104 and baseplate 102. Commercially available roofing shingles commonly range in thickness from about 0.125 inch to about 0.5 inch (about 3 mm to 13 mm). In a preferred embodiment, clip arm end 104*b* is spaced apart from baseplate top surface 102*c* by a height A of about 3 mm to receive a shingle.

In one embodiment, clip arm 104 is made of a resilient material that may elastically flex from a resting position (e.g., 3 mm) to reversibly increase the spacing between clip arm end 104*b* and baseplate top surface 102*c*, and receive shingles of different thickness. Clip arm curved portion 104*c* contributes to the elastic flexibility of clip arm 104, similarly to a leaf spring. In a further preferred embodiment, clip arm 104 is sufficiently flexible to allow the spacing between clip arm end 104*b* and baseplate top surface 102*c* to be reversibly increased to a height of at least about 0.5 inches.

As clip arm 104 is flexed from its default (resting or undeflected) position to increase the spacing between clip arm end 104*b* and baseplate top surface 102*c* and receive a shingle, the clip arm is elastically urged toward baseplate 102 to return to its default position. The elastic force exerted by clip arm 104 clamps the shingle between clip arm end 104*b* and baseplate top surface 102*c*. Clip arm end 104*b* is preferably configured to improve the clamping force and/or grip of clip arm end on a shingle inserted between clip arm 104 and baseplate 102. For example, clip arm end 104*b* may have a surface 104*d* facing baseplate 102, that is textured or patterned to increase friction and resist removal of the shingle from the grip of clip arm 104.

In one embodiment, the retention of a shingle in clip 10 is improved by a flange 106 that projects from clip arm surface 104*d* toward baseplate 102, and is positioned to contact the shingle inserted between the clip arm and baseplate. Flange 106 increases the pressure exerted by clip arm 104 on the shingle by reducing the surface area in contact with the shingle. In a preferred embodiment, flange 106 has a generally sawtooth shape that narrows to an edge positioned to contact the shingle. Flange 106 has a leading side 106*a* facing clip arm end 104*a* and clip end 102*a*, and a trailing side 106*b* facing clip arm end 104*b* and clip end 102*b*. Flange leading side 106*a* is shorter and steeper than trailing side 106*b*. In one embodiment, clip arm 104 has a default position with an angle between the outer surface of flange leading side 106*a* and the plane of baseplate top surface 102*c* of about 90°. The angle between the outer surface of flange trailing side 106*b* and the plane of baseplate top surface 102*c* is less than 90°, preferably less than 45°, and more preferably about 25°. A shingle inserted between baseplate 102 and clip arm 104 contacts flange 106, and the shallow angle of trailing side 106*b* deflects and forces the clip arm away from the baseplate to facilitate insertion of the shingle. Clip arm 104 is preferably elastically flexible to allow the spacing between flange 106 and baseplate top surface 102*c* to be reversibly increased to a height of at least about 0.5 inches to receive the shingle. Once the shingle is inserted, the steeper angle of flange leading side 106*a* resists withdrawal of the shingle and improves retention of the shingle between baseplate 102 and clip arm 104.

In one embodiment, flange 106 projects from clip arm surface 104*d* and extends below baseplate top surface 102*c*. Baseplate 102 has an opening 108 that is positioned to correspond to clip arm flange 106. When clip arm 104 is in the default position, flange 106 projects into opening 108, and extends through the plane of baseplate top surface 102*c*. In a preferred embodiment, opening 108 is a slot formed in baseplate 102 that has a length extending from clip arm end 104*a* to beyond clip arm end 104*b*, and has a width greater than the width of clip arm 104.

Baseplate 102 may be configured to facilitate installation of clip 10 on a roof shingle. In one embodiment, an angled tip 110 extends from baseplate end 102*b* to give the baseplate end a wedge-like profile that facilitates the insertion of clip base 100 between layered shingles, or between a shingle and the roof deck or underlayment. Tip 110 preferably extends from baseplate end 102*b* at angle toward baseplate lower surface 102*d*, and more preferably extends at an angle of about 15° from the plane of baseplate top surface 102*c*.

Baseplate 102 may also be configured to increase the retention of the installed clip 10. In one embodiment, at least a portion of baseplate lower surface 102*d* is patterned to increase frictional resistance to removal of the installed clip 10. For example, a series of parallel ridges or ribs 112 may be formed on baseplate lower surface 102*d*. Ribs 112 preferably extend transverse to the direction of insertion (i.e. transverse to the length of clip base 100 extending between ends 102*a* and 102*b*). When clip 10 is installed on a roof shingle, pattern 112 contacts the layered shingle, underlayment, or roof deck below, and increases the frictional resistance to removal of clip 10.

In one embodiment, socket 200 comprises a socket base 202 with top and bottom sides 202*a* and 202*b*, a plurality of fingers 204 that project from the socket base top side, and a connecting flange 206 that projects from socket base bottom side 202*b*. Socket 200 is preferably coupled to clip base 100 at baseplate 102. In the embodiment of FIGS. 1-4, socket 200 is positioned at baseplate end 102*a* opposite clip arm end 104*b* for receiving a shingle, with socket base bottom side 202*b* resting on baseplate top surface 102*c*.

Connecting flange 206 comprises a head 206*a* that is spaced apart from the bottom side 202*b* by a shaft 206*b*. Head 206*a* has a width that is greater than the width of shaft 206*b*. Baseplate 102 is configured to receive connecting flange 206 and couple socket 200 to clip base 100. In one embodiment, baseplate 102 has an aperture 114 at baseplate end 102*a*, that is sized and shaped to receive connecting flange shaft 206*b*. Connecting flange shaft 206*b* has an axial length that is at least the thickness of baseplate 102 at aperture 114, such that connecting flange 206 may extend through the aperture with connecting flange head 206*a* projecting beyond baseplate lower surface 102*d*. The width of connecting flange head 206*a* is larger than the width of aperture 114, such that baseplate 102 is captured between the connecting flange head and socket base bottom side 202*b* to couple socket 200 and clip base 100.

Socket 200 is preferably rotatably coupled to clip base 100. In one embodiment, connecting flange shaft 206*b* is cylindrical and aperture 114 is circular to allow the shaft and socket 200 to rotate within the aperture relative to clip base 100. The socket axis of rotation B is the longitudinal axis of connecting flange shaft 206*b* and the axis of aperture 114, and is transverse to the plane of baseplate top surface 102*c*, and preferably is generally perpendicular to the plane of baseplate top surface 102*c*. In one embodiment, socket 200 rotates freely (i.e. 360 degrees) relative to clip base 100.

In one embodiment socket 200 is coupled to clip base 100 by axial insertion of connecting flange 206 through aperture 114. For example, connecting flange head 206*a* may be configured for snap fit insertion by forcing the connecting flange head through aperture 114. Connecting flange 206 and/or baseplate 102 may comprise a resilient material or are otherwise elastically deformable to facilitate snap fit insertion. In another embodiment, socket 200 may be coupled to clip base 100 by lateral (radial) insertion of connecting flange 206 into aperture 114. In the embodiment of FIGS. 1-6, baseplate 102 has a slot 116 that extends between aperture 114 and the perimeter 102*e* of the baseplate 102. Slot 116 has an end with an opening 116*a* to aperture 114, and an opposite end with an opening 116*b* at the perimeter 102*e* of baseplate 102. In a preferred embodiment, slot opening 116*a* to aperture 114 has a width that is smaller than the width of connecting flange shaft 206*b*. Connecting flange shaft 206*b* is laterally inserted into aperture 114 through slot 116, and is forced through slot opening 116*a* and into the aperture by snap fit insertion. Although the embodiment of FIGS. 1-6 shows the socket 200 coupled to the baseplate top surface 102*c*, those of skill in the will appreciate that the socket may alternatively be coupled to clip base 100 at baseplate bottom surface 102*d* in the same manner.

In one embodiment, slot opening 116*b* has a width that is larger than the width of connecting flange shaft 206*b*, such that the width of slot 116 tapers (narrows) from slot opening 116*b* to slot opening 116*a*. The larger slot opening 116*b* and tapered shape of slot 116 facilitates the insertion of connecting flange shaft 206*b* into the slot and alignment for snap fit insertion through slot opening 116*a*. In another embodiment, connecting flange head 206*a* may be disc-shaped with a diameter that is larger than the diameter of connecting flange shaft 206*b*, and larger than the width of slot 116 (or at least the portion of slot 116 that forms slot opening 116*a*). The larger diameter of connecting flange head 206*a* restricts the axial movement of connecting flange 206 in slot 116, and helps guide the insertion of connecting flange shaft 206*b* in the slot.

Fingers 204 project from socket base top side 202*a*, such that fingers 204 and clip arm 104 both extend over baseplate top surface 102*c*. Fingers 204 are spaced apart on socket base top side 202*a*, and are preferably positioned about the perimeter of the socket base top side. A receptacle 208 is defined between spaced apart fingers 204 and socket base 202, that is sized and shaped to receive a conventional light bulb that comprises a bulb and base (not shown). Receptacle 208 is preferably configured to receive the base of the light bulb, with the bulb projecting outside of the receptacle. An example of a conventional light bulb received in the receptacle of a socket is shown and described in U.S. Pat. No. 11,879,619 to Kennedy, which incorporated herein by reference.

Fingers 204 extend from socket base 202 transverse to the plane of baseplate top surface 102*c*, and preferably extend generally parallel to each other and socket axis of rotation B. In one embodiment, baseplate top surface 102*c* is generally planar, and fingers 204 and socket axis of rotation B extend generally perpendicular to the plane of the baseplate top surface. In another embodiment, socket 200 comprises three fingers 204 that are spaced apart at points on the perimeter of socket base 202 that generally define an isosceles triangle—i.e. with a vertex finger, and two base fingers having mirror symmetry with respect to a plane through the vertex finger and the axis of rotation B.

Fingers 204 have opposite ends 204*a* and 204*b*. Finger ends 204*a* are coupled to socket base 202, and are fixed relative to the socket base. In one embodiment, one or more finger ends 204*a* include a strengthening fillet 210 that is formed at the intersection between end 204*a* and socket base 202. Strengthening fillet 206 increases the local thickness of fixed finger end 204*a*, and of socket base 204 for increased rigidity of the fixed end. In a preferred embodiment, each finger 204 is formed with a strengthening fillet 210.

Finger ends 204*b* project away from socket base 204, and define the inner circumference of an opening 212 to receptacle 208. In one embodiment, one or more finger ends 204*b* are elastically flexible to move away from socket axis B and allow expansion of the inner circumference of opening 212 to facilitate insertion or removal of the light bulb in socket 200. Each elastically movable end 204*b* is preferably independently flexible from the other movable ends 204*b*. In one embodiment, fingers 204 are made of a partially flexible material, such as plastic, that has sufficient rigidity to hold a light bulb securely in place, but also has sufficient flexibility to allow insertion or removal of the light bulb.

In one embodiment, one or more finger ends 204*b* include a retaining tab 214 that improves retention of the light bulb in receptacle 208. Retaining tab 214 projects from finger end 204*b* and extends radially toward axis of rotation B, generally perpendicular to finger 204 and preferably parallel to the plane of baseplate top surface 102*c*. Each retaining tab has a terminal end or edge 214*a* opposite finger 204, that defines the inner circumference of opening 212. When finger ends 204*b* are in an unflexed or resting position, the inner circumference of opening 212 preferably has a width or diameter that is smaller than the width or diameter of the light bulb base. The light bulb is mounted in socket 200, by insertion of the light bulb base through opening 212 and into receptacle 208. Finger ends 204*b* flex from their resting positions to expand the inner circumference of opening 212 to receive the larger light bulb base in receptacle 208. Once the light bulb base is fully inserted in receptacle 208, finger ends 204*b* elastically return to their resting positions to reduce the inner circumference of opening 212 and capture the light bulb base in the receptacle.

In one embodiment, retaining tabs 214 are sized and shaped to increase contact and improve retention of a light bulb base inserted in receptacle 208. For example, retaining tabs 214 may have a wedge-shape that narrows to terminal edge 214*a* that is more easily inserted between the light bulb base and bulb. Terminal edge 214*a* may also form a concave curve or arc that is complementary to the round profile of the base and bulb. In one embodiment, the sum of the arcs of terminal edges 214*a* in socket 200 comprises at least about 32% of the inner circumference of opening 212. For example, the inner circumference of socket opening 212 may be 1.73 inches and the sum of the arcs of terminal edges 214*a* is 0.73 inches.

Fingers 204 of socket 200 preferably have terminal edges 214*a* with an arc of at least about 0.07 inches, and may have arcs of the same or different lengths. In one embodiment, one finger 204 may have an arc that is greater than the sum of the sum of the arcs of the other fingers. In a preferred embodiment, fingers 204 are arranged on socket base 202 to generally form an isosceles triangle, the finger at the vertex of the triangle having an arc of 0.41 inches, and the two fingers at base of the triangle each having an arc of 0.16 inches.

One or more fingers 204 may include a wire catch 216 for routing a wire to which the light bulb 102 is connected (not shown), such as the wire (or wires) that connects and powers a series of light bulbs in a light string. Wire catch 216 projects from finger 204 between finger ends 204*a* and 204*b*, and extends generally perpendicular to the finger, and preferably circumferentially about receptacle 208. In one embodiment, wire catch 216 has upper and lower surfaces 216*a* and 216*b*. Lower surface 216*b* extends generally perpendicular to finger 204, and preferably parallel to the plane of baseplate top surface 102*c*. In operation, lower surface 216*b* contacts the light bulb wire, to catch and retain the wire in place.

Wire catch 216 may have a triangular profile to improve rigidity while maintaining a low space profile. In one embodiment, wire catch 216 has a triangular profile with the upper and lower surfaces 216*a* and 216*b* that converge to form an acute internal angle, and preferably an internal angle of about 45°. In another embodiment, wire catch 216 has a triangular profile with an external angle between upper surface 216*a* and finger 204 of about 132°, and an internal angle between upper and lower surfaces 216*a* and 216*b* of about 48°. In yet another embodiment, wire catch 216 has a triangular profile with a lower surface 216*b* that projects perpendicularly from finger 204 and has a length of about 0.30 inches, and a distance along the finger between upper and lower surfaces 216*a* and 216*b* of about 0.38 inches.

Two or more wire catches 216 are preferably arranged symmetrically about the circumference of receptacle 108. In one embodiment, socket 200 comprises three fingers 204 that are arranged on socket base 202 to generally form an isosceles triangle. The two fingers 204 at base of the triangle have wire catches 216 that extend from the finger either tangentially or circumferentially about receptacle 108, in mirror symmetry with respect to a plane through socket axis B and the finger 204 at the vertex of the triangle.

Figure 9:
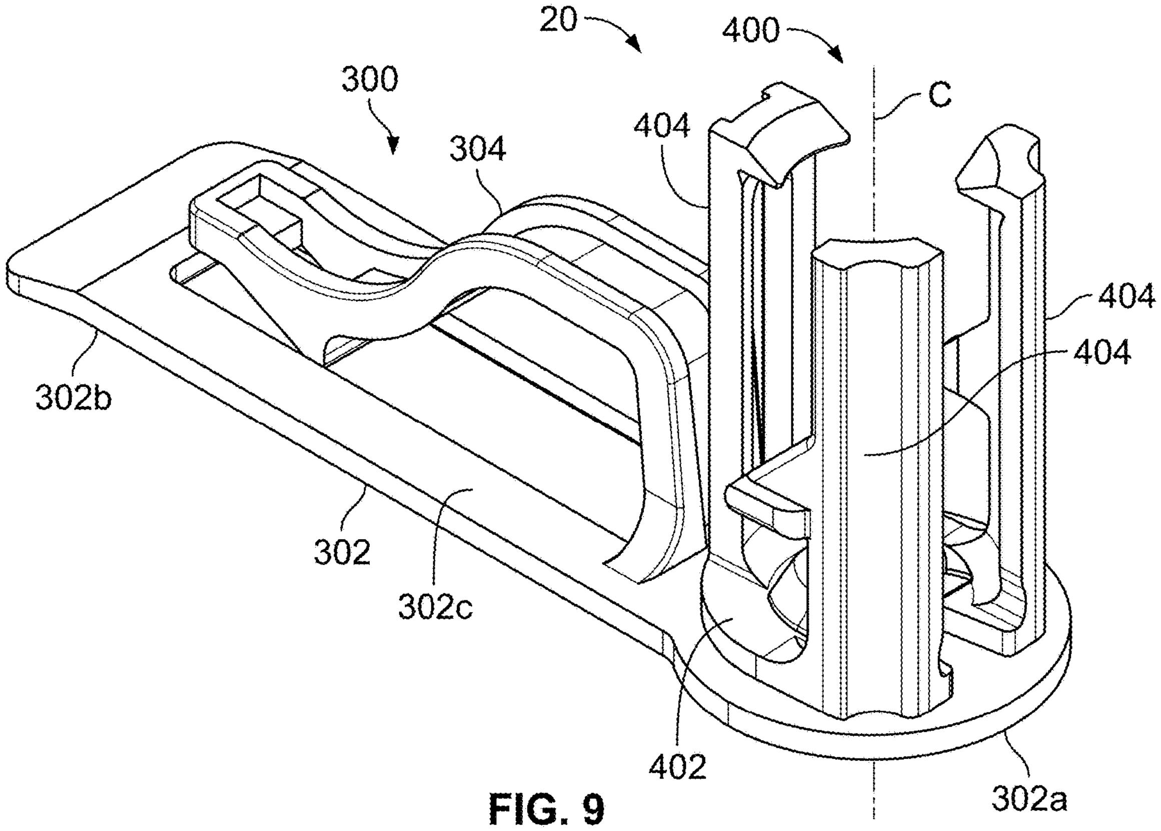
FIG. 9 is a perspective view of another embodiment of a clip for a light bulb.
Figure 10:
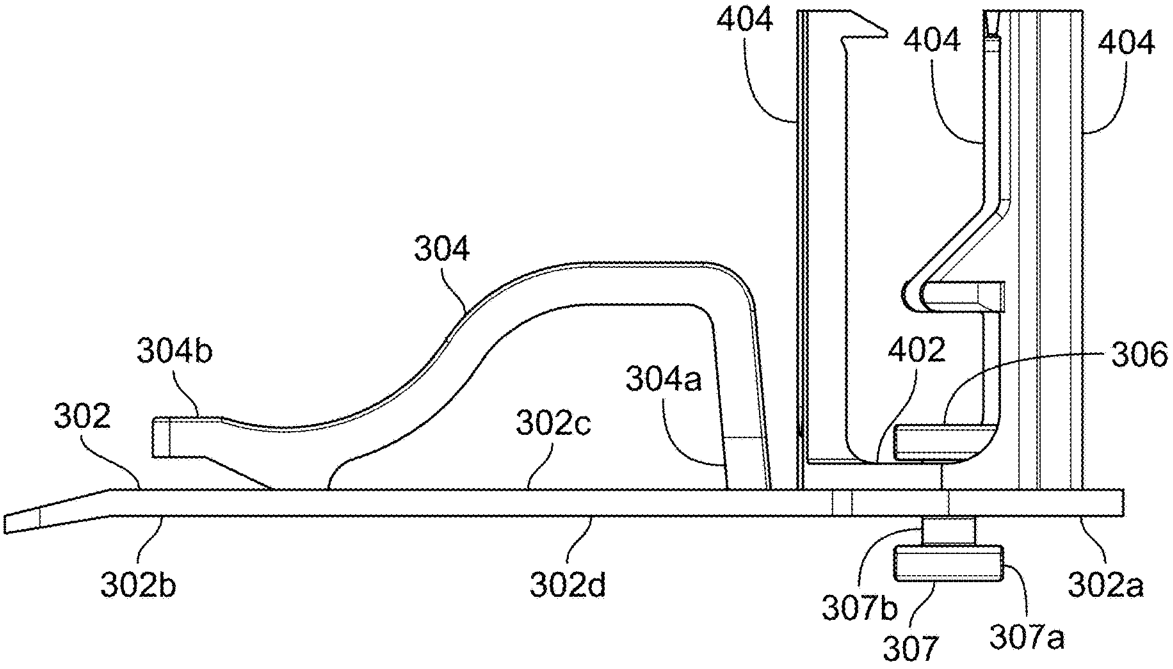
FIG. 10 is a left side elevation view of the clip of FIG. 9.
Figure 11:
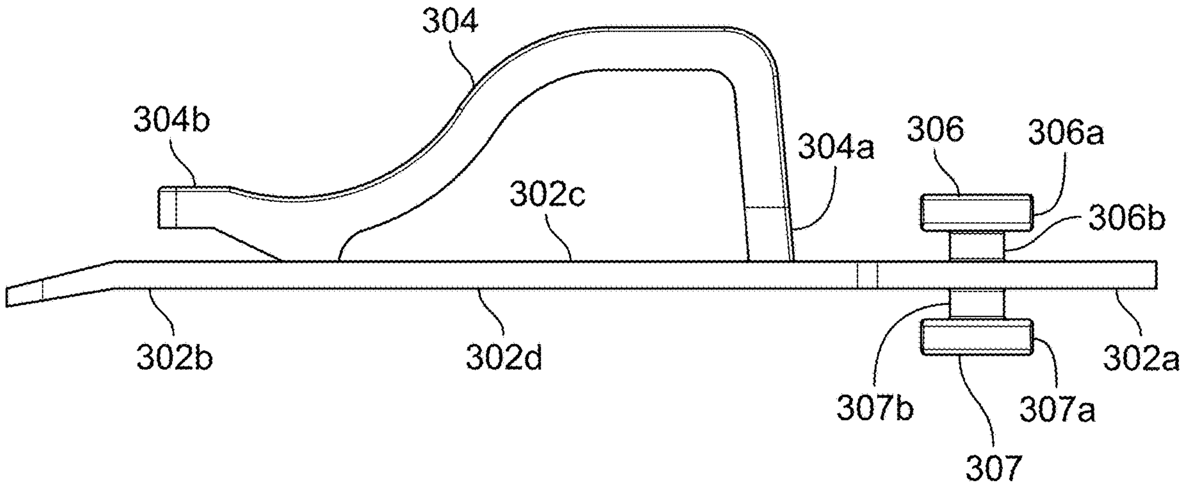
FIG. 11 is a left side elevation view of the clip base of FIG. 9.
Figure 12:
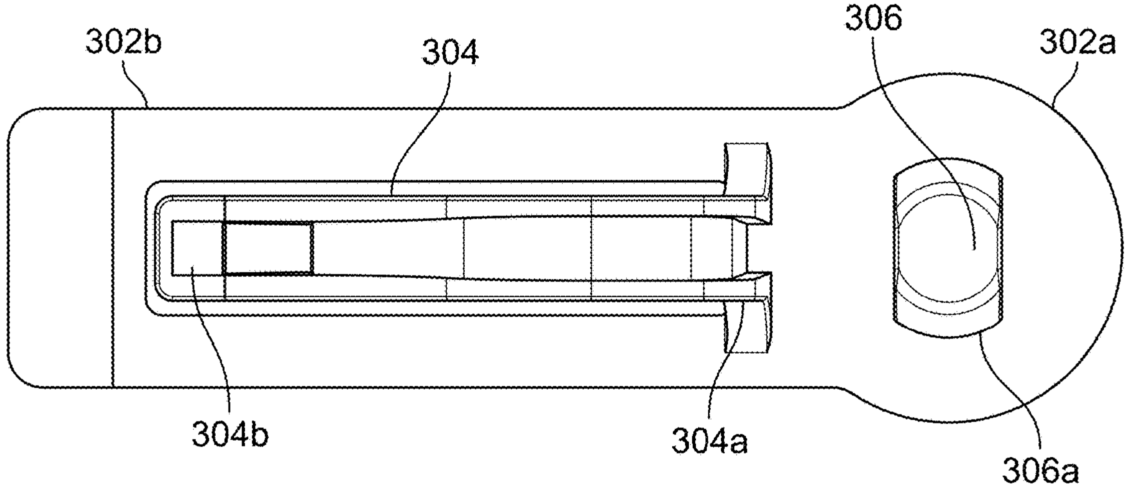
FIG. 12 is a top view of the clip base of FIG. 11.
Figure 13:
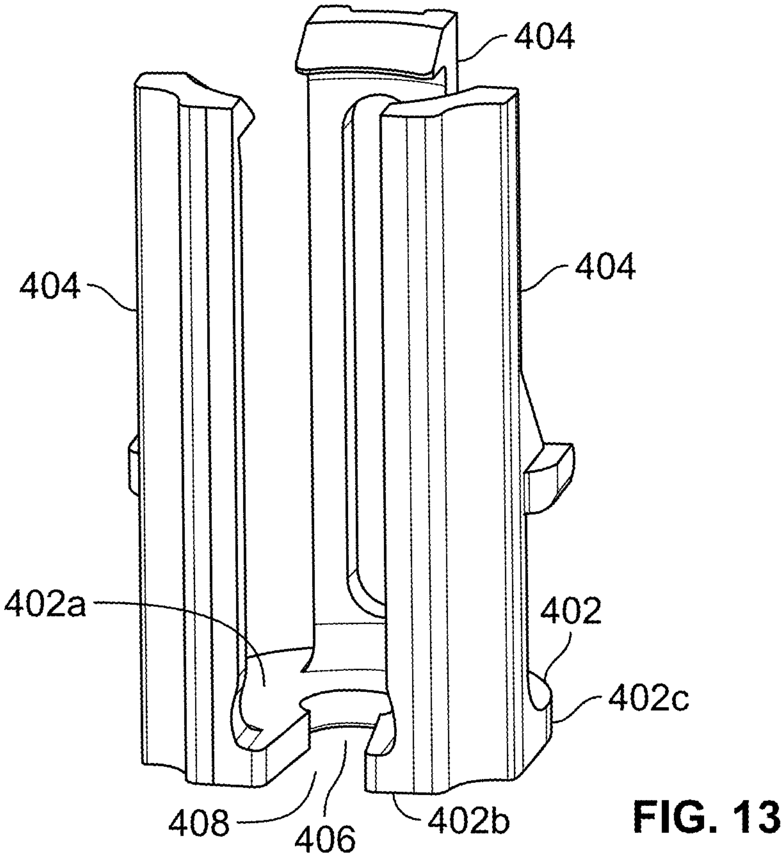
FIG. 13 is a perspective view of the socket of FIG. 9.
Figure 14:
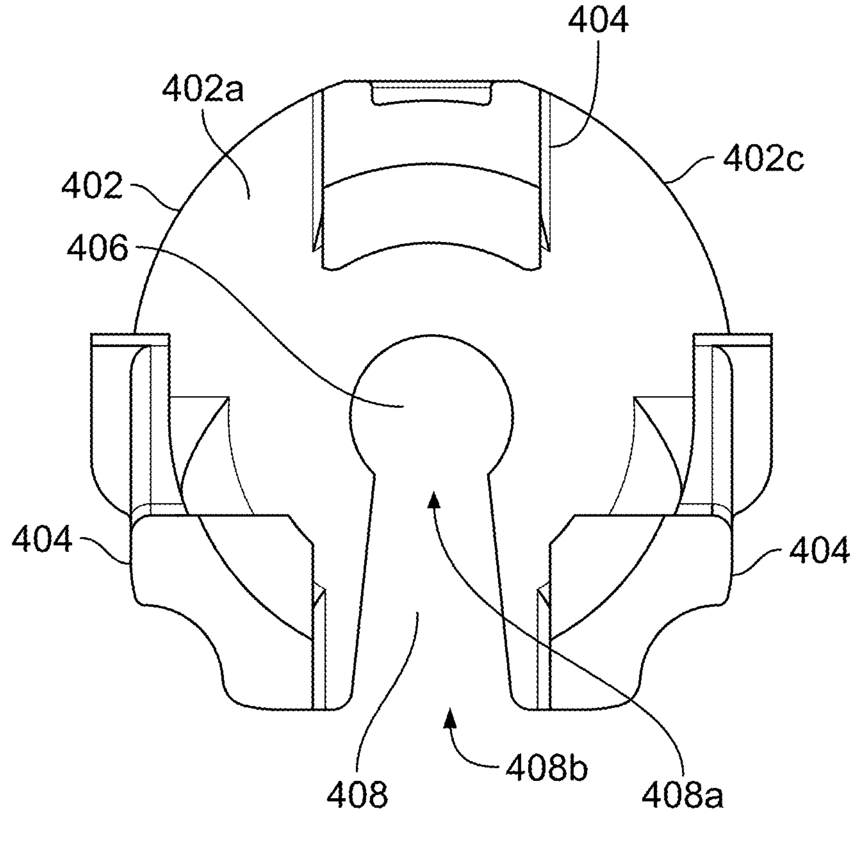
FIG. 14 is a top view of the socket of FIG. 13.

Referring to FIGS. 9-14, an alternative embodiment of a light clip 20 is shown that has a similar configuration to light clip 10, and comprises a separately formed clip base 300 and socket 400. Clip base 300 has substantially the same configuration as clip base 100, and comprises a baseplate 302 and clip arm 304. Baseplate 302 is similar to baseplate 102, and has a generally planar shape, with opposite ends 302*a* and 302*b*, and top and bottom surfaces 302*c* and 302*d*. Clip arm 304 is similar to curved clip arm 104, and extends over baseplate top surface 302*c*, with opposite ends 304*a* and 304*b*. Clip arm end 304*a* is coupled to and projects from baseplate top surface 302*c*. Clip arm end 304*b* extends toward baseplate end 302*b* generally parallel to baseplate top surface 302*c*, and is spaced apart from baseplate top surface 302*c* to receive a roofing shingle between clip arm 304 and baseplate 302. Socket 400 has substantially the same configuration as socket 200, and comprises a socket base 402 and a plurality of fingers 404. Socket base 402 has top and bottom sides 402*a* and 402*b*. Fingers 404 project from socket base top side 402*a*.

Light clip 20 differs from light clip 10 in that baseplate 302 does not have a corresponding aperture 114 and slot 116, and socket base 402 does not have a corresponding connecting flange 206. Baseplate 302 has a connecting flange 306 that is positioned at baseplate end 302*a* and projects from baseplate top surface 302*c*. Connecting flange 306 has a similar configuration to connecting flange 206, with a head 306*a* that is spaced apart from the baseplate top surface 302*c* by a shaft 306*b*. Socket base 402 has an aperture 406 through socket base 402, that has a similar configuration to aperture 114. Aperture 406 is sized and shaped to receive connecting flange shaft 306*b* and couple baseplate top surface 302*c* to socket base bottom side 402*b*.

Connecting flange shaft 306*b* has an axial length that is at least the thickness of socket base 402 at aperture 406, such that connecting flange 306 extends through aperture 406 with connecting flange head 306*a* projecting beyond socket base top side 402*a*. Connecting flange head 306*a* has a width that is greater than the width of connecting flange shaft 306*b* and aperture 406. Socket base 402 is captured between connecting flange head 306*a* and baseplate top surface 302*c* to couple socket 400 and clip base 300.

Socket 400 is preferably rotatably coupled to clip base 300. In one embodiment, connecting flange shaft 306*b* is cylindrical and aperture 406 is circular to allow the shaft and socket 400 to rotate within the aperture relative to clip base 300. The socket axis of rotation C is the longitudinal axis of connecting flange shaft 306*b* and the axis of aperture 406, and is transverse to the plane of baseplate top surface 302*c*, and preferably is generally perpendicular to the plane of baseplate top surface 302*c*. In one embodiment, socket 400 rotates freely (i.e. 360 degrees) relative to clip base 300.

In one embodiment, socket 402 includes a slot 408 that is similar to slot 116. Slot 408 extends between aperture 406 and the perimeter 402*c* of socket base 402, for lateral insertion of connecting flange shaft 306*b* into aperture 406. Slot 408 has an end with an opening 408*a* to aperture 406, and an opposite end with an opening 408*b* at the perimeter of socket bast 402. Slot opening 408*a* has a width that is smaller than the width of connecting flange shaft 306*b*.

In one embodiment, base clip 300 and socket 400 are coupled by snap fit insertion of connecting flange 306 into aperture 406 similarly to connecting flange 206 and aperture 114. For example, connecting flange 306 may be axially inserted through aperture 406. Alternatively, connecting flange shaft 306*b* may be laterally inserted into aperture 406 through slot 408, and is forced through slot opening 408*a* and into the aperture. In one embodiment, slot opening 408*b* has a width that is larger than the width of connecting flange shaft 306*b*, such that the width of slot 408 tapers from slot opening 408*b* to slot opening 408*a* to facilitate the alignment of connecting flange shaft 306*b* and snap fit insertion in slot 408.

In one embodiment, base clip 300 may include a second (or alternative) connecting flange 307 that is positioned at baseplate end 302*a* and projects from baseplate bottom surface 302*d*. Connecting flange 307 has a similar configuration to connecting flange 306, with a head 307*a* that is spaced apart from the baseplate bottom surface 302*d* by a shaft 307*b*. Connecting flange shaft 307*b* has the same width and axial length as connecting flange shaft 306*b*, to allow socket 400 to similarly couple to clip base 300 at baseplate bottom surface 302*d*. Connecting flange 307 is preferably positioned on baseplate bottom surface 102*d* directly opposite connecting flange 306, with connecting flange shafts 306*b* and 307*b* sharing the same longitudinal axis, and socket 400 having the same axis of rotation C when positioned on either the baseplate top or bottom surface.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A clip for a light bulb, comprising:
a clip base, comprising:
a baseplate with baseplate first and second ends, and baseplate top and bottom surfaces; and
a clip arm with clip arm first and second ends, the clip arm extending over the baseplate top surface, with the clip arm first end projecting from the baseplate top surface and the clip arm second end extending toward the baseplate second end; and
a separately formed socket, comprising:
a socket base with socket base top and bottom sides;
a plurality of fingers positioned on the socket base top side; and
a receptacle formed between the plurality of fingers and the socket base top side, the receptacle sized and shaped to receive the light bulb;
wherein the socket base bottom side is rotatably coupled to the clip base at the baseplate top surface.

2. The clip of claim 1, wherein the socket has an axis of rotation; and
wherein the plurality of fingers includes a first finger having first and second finger ends, the first finger end positioned at the socket base top side, and the second finger end extending away from the socket base and elastically moveable away from the axis of rotation.

3. The clip of claim 2, wherein the first finger has a fillet between the first finger end and the socket base top side.

4. The clip of claim 1, wherein the socket has an axis of rotation; and
wherein at least one finger in the plurality of fingers has first and second finger ends, the first finger end positioned at the socket base top side, and the second finger end extending away from the socket base; and
a tab positioned at the second finger end and extending perpendicularly from the second finger toward the axis of rotation.

5. The clip of claim 1, further comprising a receptacle defined between the plurality of fingers and the socket base top side, the receptacle sized and shaped to receive the light bulb;
wherein each finger in plurality of fingers has first and second finger ends, the first finger end positioned at the socket base top side, and the second finger end extending away from the socket base; and
wherein the second finger ends of the plurality of fingers define an opening to the receptacle.

6. The clip of claim 5, wherein the plurality of fingers includes a first finger having a catch flange projecting from the first finger between the first and second finger ends, the catch flange extending from the first finger about the opening to the receptacle.

7. A clip for a light bulb, comprising:
a clip base, comprising:
a baseplate with baseplate first and second ends, and baseplate top and bottom surfaces; and
a clip arm with clip arm first and second ends, the clip arm extending over the baseplate top surface, with the clip arm first end projecting from the baseplate top surface and the clip arm second end extending toward the baseplate second end;
a separately formed socket, comprising:
a socket base with socket base top and bottom sides;
a plurality of fingers positioned on the socket base top side; and
a receptacle formed between the plurality of fingers and the socket base top side, the receptacle sized and shaped to receive the light bulb; and
a connecting flange projecting from the socket base bottom side; and
an aperture formed in the baseplate, the aperture sized and shaped to receive the connecting flange and rotatably couple the socket to the clip base.

8. The clip of claim 7, wherein the connecting flange comprises a head spaced apart from the socket base bottom side by a shaft, and the aperture is sized and shaped to rotatably receive the shaft;
wherein the aperture has an aperture width, and the head has a head width that is larger than the aperture width; and
wherein the baseplate is captured between the socket base bottom side and the head, when the shaft is received in the aperture.

9. The clip of claim 8, wherein the baseplate has a baseplate perimeter, and further comprises a slot with a first slot end having a first slot opening to the aperture, and a second slot end having a second slot opening to the baseplate perimeter.

10. The clip of claim 9, wherein the shaft is received in the aperture by snap fit insertion through the first slot opening.

11. The clip of claim 9, wherein the first slot opening has a first opening width, the slot second opening has a second opening width that is larger than the first opening width, and the slot has a slot width that narrows from the second slot end to the first slot end.

12. A clip for a light bulb, comprising:
a clip base, comprising:
a baseplate with baseplate first and second ends, and baseplate top and bottom surfaces; and a clip arm with clip arm first and second ends, the clip arm extending over the baseplate top surface, with the clip arm first end projecting from the baseplate top surface and the clip arm second end extending toward the baseplate second end; and a separately formed socket, comprising:

a socket base with socket base top and bottom sides;

a plurality of fingers positioned on the socket base top side;

an opening in at least one finger in the plurality of fingers; and a receptacle formed between the plurality of fingers and the socket base top side, the receptacle sized and shaped to receive the light bulb;

wherein the socket is rotatably coupled to the clip base.

13. The clip of claim 12, wherein the opening is a slot extending longitudinally along the finger.

14. A clip for a light bulb, comprising:

a clip base, comprising:

a baseplate with baseplate first and second ends, and baseplate top and bottom surfaces; and a clip arm with clip arm first and second ends, the clip arm extending over the baseplate top surface, with the clip arm first end projecting from the baseplate top surface and the clip arm second end extending toward the baseplate second end; and a separately formed socket, comprising:

a socket base with socket base top and bottom sides;

a plurality of fingers positioned on the socket base top side; and a receptacle formed between the plurality of fingers and the socket base top side, the receptacle sized and shaped to receive the light bulb;

wherein the socket is rotatably coupled to the clip base and has an axis of rotation; and wherein the plurality of fingers include first, second, and third fingers, the first finger and the axis of rotation defining a plane, and the second and third fingers positioned on the socket base top side in mirror symmetry with respect to the plane.

15. The clip of claim 14, wherein the first finger has a slot extending longitudinally along the first finger.

16. A clip for a light bulb, comprising:

a clip base, comprising:

a baseplate with baseplate first and second ends, and baseplate top and bottom surfaces; and a clip arm with clip arm first and second ends, the clip arm extending over the baseplate top surface, with the clip arm first end projecting from the baseplate top surface and the clip arm second end extending toward the baseplate second end; and a separately formed socket, comprising:

a socket base with socket base top and bottom sides, wherein the socket is rotatably coupled to the clip base and has an axis of rotation;

a plurality of fingers positioned on the socket base top side, wherein each finger in the plurality of fingers has first and second finger ends, the first finger end positioned at the socket base top side, and the second finger end extending away from the socket base a tab positioned at each second finger end in the plurality of fingers and extending perpendicularly from the second finger toward the axis of rotation, the tab having a tab edge;

a receptacle formed between the plurality of fingers and the socket base top side, the receptacle sized and shaped to receive the light bulb; and an opening to the receptable having a circumference defined by the tab edges of each finger in the plurality of fingers, wherein the sum of the tab edges comprises at least about 32% of the circumference.

17. A clip for a light bulb, comprising:

a clip base, comprising:

a baseplate with baseplate first and second ends, and baseplate top and bottom surfaces; and a clip arm with clip arm first and second ends, the clip arm extending over the baseplate top surface, with the clip arm first end projecting from the baseplate top surface and the clip arm second end extending toward the baseplate second end; and a separately formed socket, comprising:

a socket base with socket base top and bottom sides;

a plurality of fingers positioned on the socket base top side; and a receptacle formed between the plurality of fingers and the socket base top side, the receptacle sized and shaped to receive the light bulb;

a connecting flange projecting from the baseplate top surface; and an aperture formed in the socket base, the aperture sized and shaped to receive the connecting flange and rotatably couple the socket to the clip base.

18. The clip of claim 17, wherein the socket has an axis of rotation, and the socket base has a socket base perimeter; and wherein the connecting flange comprises a head spaced apart from the socket base bottom side by a shaft, and the aperture is sized and shaped to rotatably receive the shaft;

wherein the socket base includes a slot with a first slot end having a first slot opening to the aperture, and a second slot end having a second slot opening to the socket base perimeter; and wherein the shaft is received in the aperture by snap fit insertion through the first slot opening.

19. The clip of claim 18, wherein the plurality of fingers include first, second, and third fingers, the first finger and the axis of rotation defining a plane, and the second and third fingers positioned on the socket base top side in mirror symmetry with respect to the plane; and wherein the slot extends along the plane.

* * * * *